(12) United States Patent
Grau et al.

(10) Patent No.: US 8,083,261 B2
(45) Date of Patent: Dec. 27, 2011

(54) POSITIONING DEVICE

(75) Inventors: Hermann Grau, Durlangen-Tanau (DE); Wolfgang Holbein, Alfdorf (DE); Karsten Kortschack, Lorch (DE); Wolfgang Spindler, Durlangen (DE); Alexander Seibold, Schwaebisch Gmuend (DE); Jonas Mueller, Schwaebisch Gmuend-Burgholz (DE)

(73) Assignee: TRW Automotive GmbH, Alfdorf (DE)

( * ) Notice: Subject to any disclaimer, the term of this patent is extended or adjusted under 35 U.S.C. 154(b) by 225 days.

(21) Appl. No.: 12/455,759

(22) Filed: Jun. 5, 2009

(65) Prior Publication Data
US 2009/0302593 A1 Dec. 10, 2009

(30) Foreign Application Priority Data
Jun. 5, 2008 (DE) .......................... 10 2008 026 872

(51) Int. Cl.
*B60R 22/00* (2006.01)
(52) U.S. Cl. ..................... 280/801.1; 254/388; 254/389; 254/393; 254/394
(58) Field of Classification Search ............... 280/801.1; 254/202, 225, 388, 389, 393, 394, 398
See application file for complete search history.

(56) References Cited

U.S. PATENT DOCUMENTS

| | | | | |
|---|---|---|---|---|
| 5,129,679 A | * | 7/1992 | Specht et al. | 280/806 |
| 5,290,062 A | * | 3/1994 | Fohl | 280/801.2 |
| 5,295,714 A | * | 3/1994 | Fohl | 280/806 |
| 5,568,940 A | * | 10/1996 | Lane, Jr. | 280/806 |
| 5,615,917 A | * | 4/1997 | Bauer | 280/806 |
| 5,685,567 A | * | 11/1997 | Koujiya et al. | 280/806 |
| 5,762,372 A | * | 6/1998 | Koujiya et al. | 280/806 |
| 6,155,727 A | * | 12/2000 | Wier | 297/480 |
| 6,250,720 B1 | * | 6/2001 | Wier | 297/468 |
| 6,299,211 B1 | * | 10/2001 | Wier | 280/806 |
| 6,726,250 B2 | * | 4/2004 | Ennerdal | 280/806 |
| 6,976,707 B2 | * | 12/2005 | Modinger et al. | 280/806 |
| 7,584,997 B2 | * | 9/2009 | Bachmann et al. | 280/801.1 |

* cited by examiner

Primary Examiner — Toan To
(74) Attorney, Agent, or Firm — Tarolli, Sundheim, Covell & Tummino LLP

(57) ABSTRACT

A positioning device has a deformable load-bearing element (10), a shaped part (12) coupled to the load-bearing element (10), and a holder (24). The load-bearing element (10) is adapted to be shifted from a first position in which the shaped part (12) is held in a first shape by the holder (24), into a second position in which the shaped part (12) is at least partially no longer held by the holder (24) and takes a second shape which is transmitted to the load-bearing element (10).

19 Claims, 2 Drawing Sheets

POSITIONING DEVICE

TECHNICAL FIELD

The invention relates to a positioning device, in particular to position a belt buckle or a safety belt in a motor vehicle.

BACKGROUND OF THE INVENTION

Positioning devices for belt buckle presenting systems are known, which facilitate the positioning on of the safety belt for a vehicle occupant by raising the belt buckle from a lower holding position into an upper presenting position before the seat belt is fastened. After having inserted the insertion tongue of the safety belt into the belt buckle, the belt buckle is lowered again from the presenting position into the holding position in which it remains during driving. Before the seat belt is unfastened, the belt buckle is raised again so as to also permit a comfortable releasing of the insertion tongue from the belt buckle for the occupant before it is then lowered again.

Similar positioning devices are also used in belt presenting systems. In particular in two-door vehicle models, measures to make the fastening of the safety belt easier are practical, since otherwise the occupant would have to fetch the insertion tongue of the safety belt from far behind. With a positioning device, the safety belt together with the insertion tongue can be brought towards the occupant.

It is an object of the invention to provide a space-saving positioning device which can largely do without a guiding means.

BRIEF SUMMERY OF THE INVENTION

According to the invention, a positioning device has a deformable load-bearing element, a shaped part coupled to the load-bearing element, and a holder. The load-bearing element is adapted to be shifted from a first position in which the shaped part is held in a first shape by the holder, into a second position in which the shaped part is at least partially no longer held by the holder and takes a second shape which is transmitted to the load-bearing element.

In order to define the desired final position, instead of a separate guide which requires space, the present invention provides the specific shaped part, the shape of which changes when the load-bearing element is extended out of the holder. Due to the coupling to the shaped part, the position of the load-bearing element, and therefore of the object to be positioned, is purposefully influenced. The coupling type and in particular the design of the shaped part thus permit to obtain a movement of the load-bearing element which differs from the shifting direction without any separate guide being necessary therefor.

The positioning device according to the invention permits to load the load-bearing element exclusively in tension rather than in compression, since the entire compression loading can be absorbed by means of the shaped part. This fact permits the use of a flexible cable as a load-bearing element, for which a compression loading would be damaging. With an appropriate selection of the materials for the holder and for the shaped part, the wear can be reduced further, and it is possible to obtain a higher cycle number than in comparable positioning devices. Together with the selection of the materials, a suitable shaping can lead to an optimization of the friction contact surface between the shaped part and the holder, such that comparatively low forces are necessary to shift the load-bearing element.

Preferably, the shaped part is movably arranged on the load-bearing element so that the shaped part can take a different spatial position due to a longitudinal movement, contraction or expansion permitted in the extended position of the load-bearing element.

This change in position can be forced by a spring element, for example, which exerts an axial force onto the shaped part.

In order that the change in position reaches a defined extent, positioning means may be provided for limiting the movability of the shaped part on the load-bearing element.

The initial shape can be imposed on the shaped part in that in the first position of the load-bearing element, the shaped part rests against a wall of the holder so that the shaped part is thereby held in the first shape.

According to the preferred embodiment of the invention, the shaped part is a shaped element group comprising a plurality of shaped elements. By an individual configuration and arrangement of the individual shaped elements, it is possible to obtain without further auxiliary means a non trivial movement path upon extension of the load-bearing element.

The shaped elements are preferably arranged in line on the load-bearing element. For this purpose, the shaped elements have bores which are traversed by the load-bearing element. In case a wire cable is used as a load-bearing element, an undesired so-called bird-caging of the wire cable can be counteracted by such an arrangement of the shaped elements in that the bores are chosen to be only slightly larger than the diameter of the wire cable.

In particular, the desired movement path of the load-bearing element can be realized in that axial spaces which are present between adjacent shaped elements in the first position of the shaped element group are eliminated by pushing the shaped elements together when the load-bearing element is extended.

To this end, shaped elements are particularly advantageous which have inclined contact surfaces with respect to the longitudinal axis of the load-bearing element. Due to a pushing together of the shaped elements which is possible outside the holder, they tilt until they rest against the contact surfaces of the adjacent shaped element. With an appropriate configuration (orientation and inclination), a precise definition of the movement path in individual stages is thus possible.

The defined specification of the movement can be further influenced or supported by connections between the individual shaped elements.

The invention can be used particularly advantageously in belt buckle presenting or belt presenting systems. A belt buckle or a safety belt as an object to be positioned is then coupled to the load-bearing element.

DETAILED DESCRIPTION OF THE PREFERRED EMBODIMENTS

Figure 1:
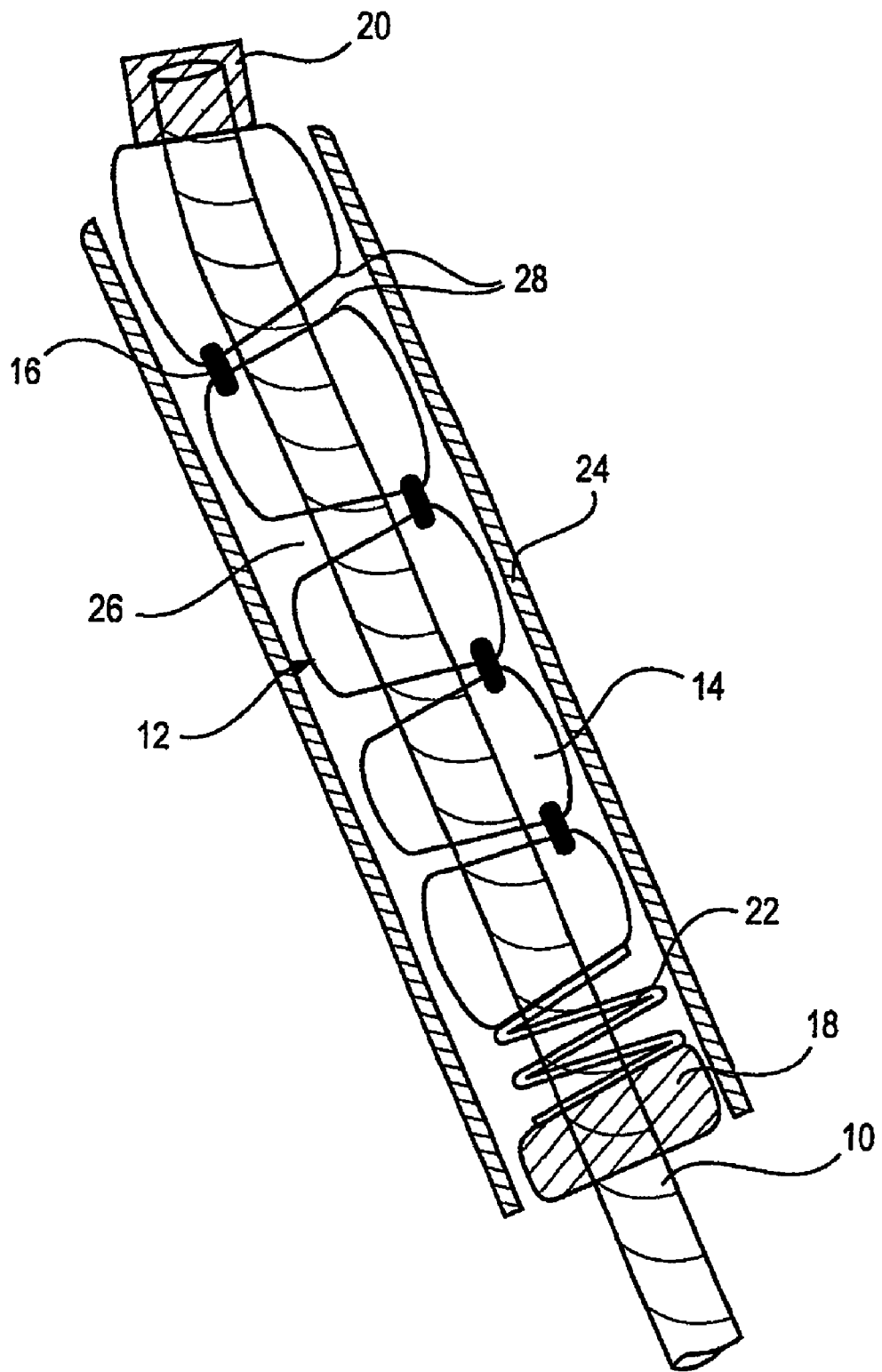
FIG. 1 shows a lateral sectional view of a positioning device according to the invention in a first position.

The positioning device shown in a first position in FIG. 1 has a load-bearing element 10 to which an object to be positioned, such as, e.g. a safety belt or a belt buckle, can be coupled. The load-bearing element 10 is longitudinal and deformable (preferably elastic) but is sufficiently rigid to be adapted to bear the object coupled thereto. To this end, a wire cable is in particular suitable. The load-bearing element 10 can be shifted in the longitudinal direction (axially) by means of a drive (not illustrated).

A shaped part 12 is coupled to the load-bearing element 10. In the embodiment represented, the shaped part 12 is a shaped element group comprising a plurality of shaped elements 14. The shaped elements 14 each have a through bore and are arranged in line on the load-bearing element 10 like a pearl necklace. According to FIG. 1, each shaped element 14 is connected with its adjacent shaped elements 14, the connections 16 being however shown only symbolically. In other embodiments, it is possible to provide less or no connections between the shaped elements 14. In the form of the shaped element group represented in FIG. 1, which is determined by the position of the shaped elements 14, all shaped elements 14 have approximately the same maximum outer diameter with respect to the longitudinal axis of the load-bearing element 10.

The axial movability of the shaped part 12 is limited by positioning means in the form of two positioning elements 18, 20 attached to the load-bearing element 10. A spring element 22 is arranged between the shaped part 12 and the first positioning element 18, which holds the shaped part 12 under prestress. The spring element 22 exerts a force acting in the axial direction and therefore pushes the shaped part 12 against the second positioning element 20.

In the embodiment shown, the object to be positioned is coupled to the load-bearing element 10 in the region of the second positioning element 20 or further upwards.

In the initial position of the load-bearing element 10, the shaped part is substantially completely surrounded by a rigid, generally cylindrical holder 24 along its axial length, the end faces of the holder being open. As explained below in further detail, the form and the arrangement of the individual shaped elements 14 are adapted in a particular manner both to the holder 24 and to the desired spatial final position and, if required, to the concrete movement path of the object to be positioned.

The diameter of the bores of the shaped elements 14 is not substantially larger than the diameter of the load-bearing element 10, a sliding of the shaped elements 14 on the load-bearing element 10 being ensured. The diameter of the holder 24 and the outer contour of the shaped elements 14 are chosen such that the shaped elements 24 can each take a position in the holder 24 only in a specific condition in which the load-bearing element 10 extends parallel to the holder 24 (first shape of the shaped part 12). In this imposed condition, the shaped elements 14 lie against the inner wall of the holder 24 such that they cannot tilt. In the first shape of the shaped part 12, spaces 26 are present between adjacent shaped elements 14 which result from the outer shape of the shaped elements 14. More precisely, among two opposed contact surfaces 28 of two adjacent shaped elements 14, at least one contact surface 28 is inclined with respect to the longitudinal axis of the load-bearing element 10. The number and form of the spaces 26 is determined by the desired final position (and, possibly by the movement path) of the object to be positioned, as results from the function description below.

Figure 2:
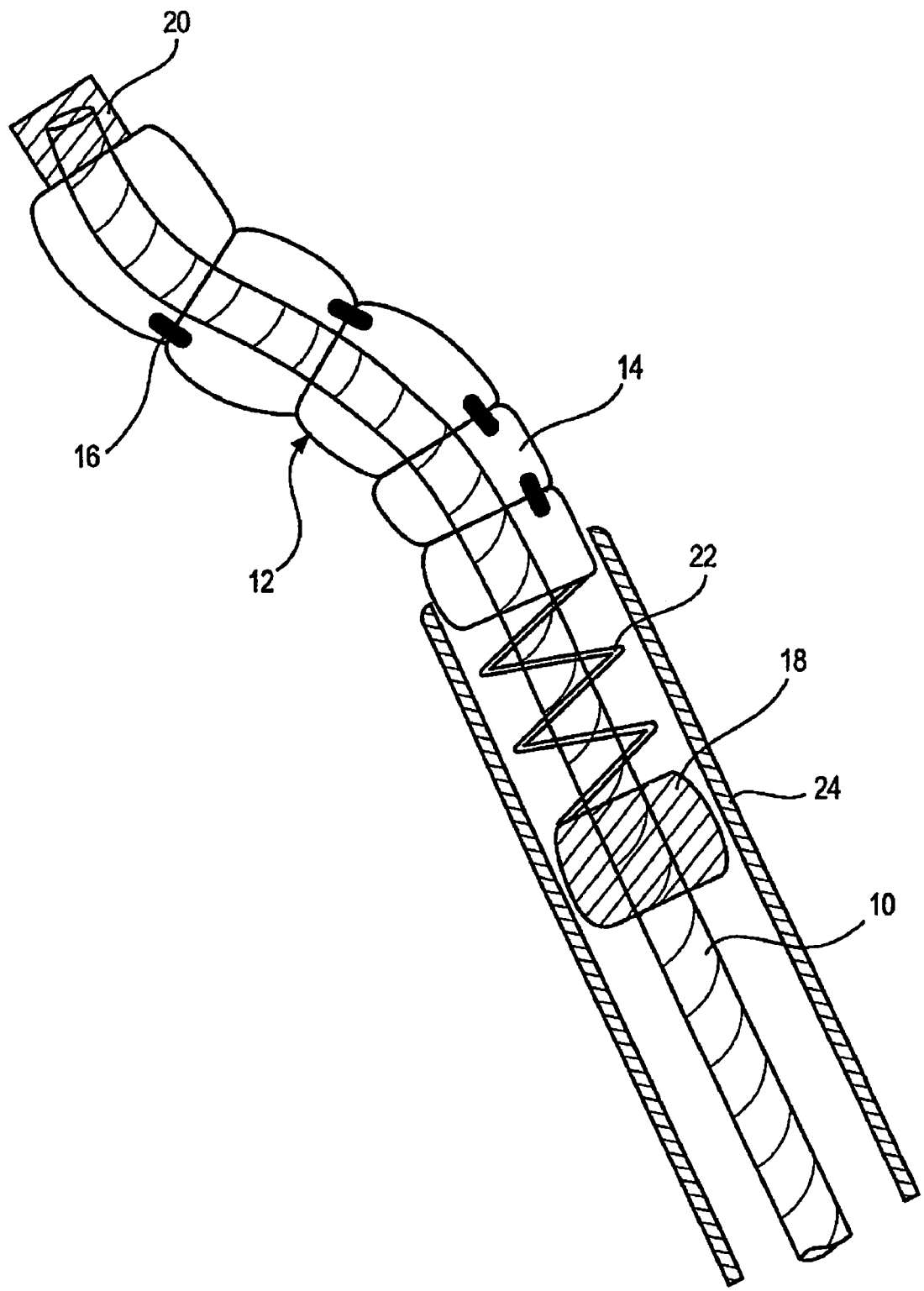
FIG. 2 shows the positioning device of FIG. 1 in a second position.

FIG. 2 shows the positioning device in a second position which it takes after an axial shifting of the load-bearing element 10 into an extended position. Those shaped elements 14 which no longer rest against the inner wall of the holder 24 are no longer forced to take the first position shown in FIG. 1. Rather, the axially acting force of the spring element 22 ensures that the shaped elements 14 tilt about the contact or connecting points. The spaces 26 are reduced until the shaped elements 14 rest against each other over an area. During this process, the load-bearing element 10 is bent in a defined manner.

It is apparent that the design of the shaped part 12, in particular the orientation and inclination of the contact surfaces 28 of the shaped elements 14 dictate the movement path and finally the final position of the object to be positioned.

However, the load-bearing element 10 can also have a plurality of partial elements that are movable relative to each other to provide further degrees of freedom for even more complex sequences of movements.

The shaped part 12 can also be realized in a different way than by the shaped element group described, insofar as it comprises comparable properties.

If desired, the shaped part 12 can also be provided with electrical lines for an electrical connection of the object to be positioned (mounting outside or within the shaped part 12).

The materials of the holder 24 and of the shaped part 12 are adapted to each other such that the friction between these two components is very small. This is important for the wear and the useful life of the position device with respect to a possibly unfavorable friction coefficient combination of the holder 24 and the load-bearing element 10 (in particular in case of a wire cable).

By choosing an optically high-quality material for the shaped part 12, the positioning device can be revalued. In this case, a visual protection can be dispensed with.

According to the preferred uses of the invention, a belt buckle or a safety belt is coupled to the load-bearing element 10. However, the invention is not limited to these uses.

The invention claimed is:

1. A positioning device having
a deformable load-bearing element,
a shaped part coupled to the load-bearing element, and
a holder, the load-bearing element being adapted to be shifted from a first position in which the shaped part is held in a first shape by the holder, into a second position in which the shaped part is at least partially no longer held by the holder and takes a second shape which is transmitted to the load-bearing element.

2. The positioning device according to claim 1, wherein the shaped part is movably mounted on the load-bearing element.

3. The positioning device according to claim 2, further comprising a spring element which exerts an axial force onto the shaped part.

4. The positioning device according to claim 2, further comprising positioning means for limiting the movability of the shaped part on the load-bearing element.

5. The positioning device according to claim 1, wherein in the first position of the load-bearing element, the shaped part rests against a wall of the holder so that the shaped part is thereby held in the first shape.

6. The positioning device according to claim 1, wherein the shaped part is a shaped element group comprising a plurality of shaped elements (14).

7. The positioning device according to claim 6, wherein the shaped elements (14) have bores traversed by the load-bearing element.

8. The positioning device according to claim 6, wherein in the first shape of the shaped part, axial spaces (26) are present between adjacent shaped elements (14).

9. A positioning device having
a deformable load-bearing element,
a shaped part coupled to the load-bearing element, the shaped part including a shaped element group having a plurality of shaped elements (14), wherein the shaped elements (14) have inclined contact surfaces (28) with respect to the longitudinal axis of the load-bearing element, and a holder, the load-bearing element being adapted to be shifted from a first position in which the shaped part is held in a first shape by the holder, into a second position in which the shaped part is at least partially no longer held by the holder and takes a second shape which is transmitted to the load-bearing element.

10. The positioning device according to claim 6, wherein connections (16) are provided between individual shaped elements (14).

11. The positioning device according to claim 1, wherein the load-bearing element is a wire cable.

12. The positioning device according to claim 1, wherein the load-bearing element comprises a plurality of partial elements.

13. The positioning device according to claim 1, wherein a belt buckle is coupled to the load-bearing element.

14. The positioning device according to claim 1, wherein a safety belt is coupled to the load-bearing element.

15. The positioning device according to claim 1, wherein the second shape is different from the first shape.

16. The positioning device according to claim 1, wherein the first shape is substantially straight and the second shape is curved.

17. The positioning device according to claim 1, wherein the load-bearing element exhibits the first shape when the shaped part is held in the first shape, the load-bearing element exhibiting the second shape when the shaped part takes the second shape.

18. The positioning device according to claim 6, wherein at least two of the plurality of shaped elements engage one another when the shaped part takes the second shape.

19. The positioning device according to claim 1, wherein the shaped part takes the second shape when at least a portion of the shaped part extends out of the holder.

* * * * *